United States Patent [19]

Economy

[11] Patent Number: 4,583,753
[45] Date of Patent: Apr. 22, 1986

[54] DESK ATTACHMENT FOR SHOPPING CART

[76] Inventor: Charles G. Economy, 315 Crosstree La., Atlanta, Ga. 30328

[21] Appl. No.: 632,622

[22] Filed: Jul. 19, 1984

[51] Int. Cl.[4] ............................................. B62B 39/00
[52] U.S. Cl. ............................................. 280/33.99 A
[58] Field of Search ............... 108/43; 248/206.5, 247; 24/67.5, 67.7; 220/230; 206/818; 280/33.99 A

[56] References Cited

U.S. PATENT DOCUMENTS

| | | | |
|---|---|---|---|
| 2,864,189 | 12/1958 | Campbell | 280/33.99 A |
| 3,215,452 | 11/1965 | Goodwin | 24/67.5 |
| 4,034,539 | 7/1977 | Economy | 280/33.99 A |
| 4,100,684 | 7/1978 | Berger | 248/206.5 |
| 4,156,318 | 5/1979 | Economy | 280/33.99 A |
| 4,356,651 | 11/1982 | Barlow | 280/33.99 A |

Primary Examiner—David M. Mitchell
Assistant Examiner—Richard M. Camby
Attorney, Agent, or Firm—Jones & Askew

[57] ABSTRACT

Stated in general terms, the present invention is directed to a desk apparatus attachable to a shopping cart for providing a stable surface supported at an angle convenient for viewing or writing by the shopper. The desk apparatus is supported by one or more walls of the shopping cart, especially the back wall, and is readily foldable or, alternatively, removable so as not to interfere with existing cart functions such as nesting or unloading. The desk platform has a hinged lid compartment for storing shopper's items such as coupons, lists, or the like.

5 Claims, 10 Drawing Figures

DESK ATTACHMENT FOR SHOPPING CART

BACKGROUND OF THE INVENTION

This invention relates to a shopping cart attachment and more particularly relates to a shopping cart desk attachment which will provide a substantially flat and stable writing surface.

Most modern supermarkets include shopping carts which a shopper can maneuver over the shopping area to carry goods to be purchased. One of the problems in utilizing a shopping cart relates to the use of a shopping list by the shopper since it is often desirable to mark off listed items as they are located. Without the aid of a desk attachment to the cart providing a substantially flat and stable writing surface, it is inconvenient to mark items off the list. Further, it is usually cumbersome for the shopper to hold a list and a writing instrument while placing items to be purchased in the cart.

Another problem relates to locating items in the shopping area. Many supermarkets include signs located above particular shopping aisles to identify a few of the items located in the respective aisle. However, these shopper guides do not include many of the items located in the shopping area and may be somewhat difficult to read from a distance. Further, it is frequently difficult to see all the signs from any particular point in the store so that it is sometimes necessary to traverse a number of aisles before locating the item desired.

Various desk attachments for shopping carts are known, for example those shown in U.S. Pat. Nos. 4,034,539 and 4,156,318, which are hereby incorporated by reference.

SUMMARY OF THE INVENTION

It is an object of the present invention to provide an improved desk attachment for a shopping cart.

It is another object to provide a collapsible desk attachment for a shopping cart with means for selecting the inclination of the desk attachment when in a use position, especially in conjunction with a shopping cart of the type having a collapsible rear compartment in its basket.

It is another object to provide a collapsible desk attachment particularly adapted for use in conjunction with shopping carts of the type not necessarily having collapsible compartments in their baskets.

Stated in general terms, the present invention is directed to a desk apparatus attachable to a shopper cart for providing a stable surface supported at an angle convenient for viewing or writing by the shopper. The desk apparatus is supported by one or more walls of the shopping cart, especially the back wall, and is readily foldable or, alternatively, removable so as not to interfere with existing cart functions such as nesting or unloading.

Stated somewhat more specifically, in a first mode of the invention, there is provided a desk attachment for a shopping cart having a rear infant carrier compartment collapsible as between its front and rear walls. The attachment includes a planar desk platform of a length sufficient to rest across the top of the compartment when open, and a pivot device at one end of the platform for pivotally engaging the top of one wall of the shopping cart. Stated even more specifically, the device comprises an articulated hanger.

In one preferred embodiment, the hanger has a selected length corresponding to the inclination of the platform with respect to the compartment when open. This embodiment is especially adapted for semipermanent attachment to a shopping cart of the type having a collapsible back wall with an infant carrier in that the desk attachment collapses to a nonuse position which does not hinder collapse of the cart compartment.

Preferably, the desk platform includes a region for receiving and displaying information such as advertising material or the like. This region may comprise a hollow, transparent shell to display advertising material or the like contained therein, and having a removable end cap for access to the material.

In another preferred embodiment, the desk platform further comprises a hinged lid compartment for storing shopper's items such as coupons, lists, or the like. This embodiment is especially useful as a portable desk attachment to be removed from the shopping cart by the user at the conclusion of cart use.

In another mode of the invention, being especially adapted for use with a shopping cart of the type not necessarily having a collapsible rear compartment in its basket, there is provided a cantilevering desk attachment carried on and supported by a single wall of the cart. This desk attachment comprises a desk platform, one or more tracking members for vertically tracking on a basket wall of a shopping cart, a linkage for pivotally linking one end of the platform to the tracking members, and a cantilevering connection for cantilevering the platform from the wall when the tracking members are moved to a terminal position at the top of the wall and the platform is pivoted at the linkage about the top of the wall from a vertical nonuse position to a cantilevered use position.

BRIEF DESCRIPTION OF THE DRAWINGS

Further details are given below with reference to the drawings wherein.

DESCRIPTION OF THE PREFERRED EMBODIMENTS

Figure 1:
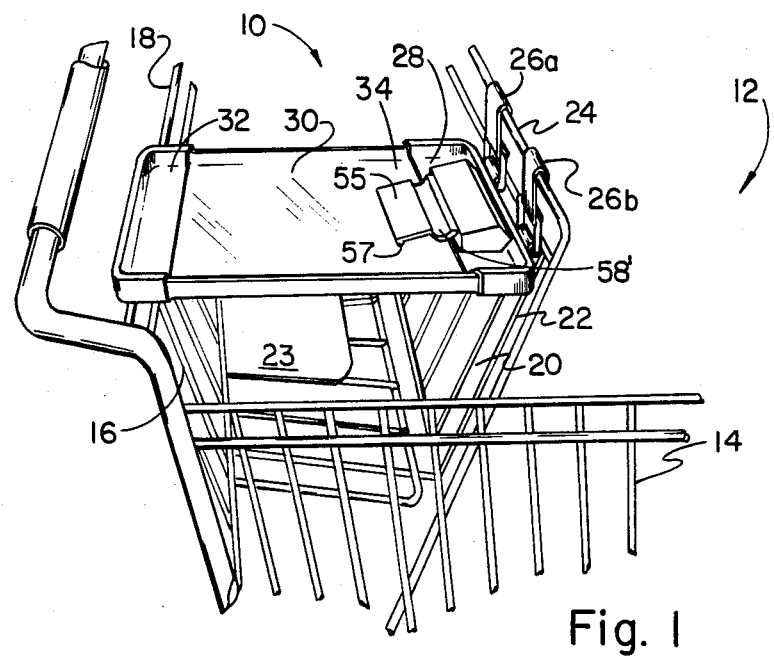
FIG. 1 is a partial perspective view of a shopping cart having a collapsible rear compartment and having attached thereto a preferred embodiment of the desk attachment of the present invention.

In FIG. 1, there is partially shown a conventional shopping cart 12 with desk attachment 10, in accordance with the invention, affixed thereto. Shopping cart 12 being of conventional design has an open basket of open irregular mesh construction of metal rods, for example as indicated at 14 on a basket side wall. Cart 12 has rear wall 16 which is pivotal about its top rod member 18 so that baskets of a plurality of carts not in use may be serially inserted. Cart 12 has a collapsible rear compartment 20, shown in the open position, which is formed by the front compartment wall 22 being pivotally secured at the base of rear wall 16. Typically, the rear compartment has a collapsible, pivotally mounted seat 23.

Collapsible wall 22 has a top rod member 24 to which are pivotally secured hangers 26a, 26b of desk attachment 10. Desk attachment 10 has a planar desk platform 30 with upper end cap 28 and lower end cap 32. Articulated hangers 26a, 26b are secured to the underside of upper end cap 28 while the lower end cap 32 rests on the top rod member 18 of rear cart wall 16, the overall length of desk attachment 10 being sufficient to span rear compartment 20 when open. End cap 28 has affixed thereto the clamp 34 for holding writing paper on platform 30. Hangers 26a, 26b are selected length such that platform 30 is at a desired inclination when in the use position as shown in FIG. 1. Preferably, the length of hangers 26a, 26b is sufficient such that platform 30 is substantially horizontal.

Figure 2:
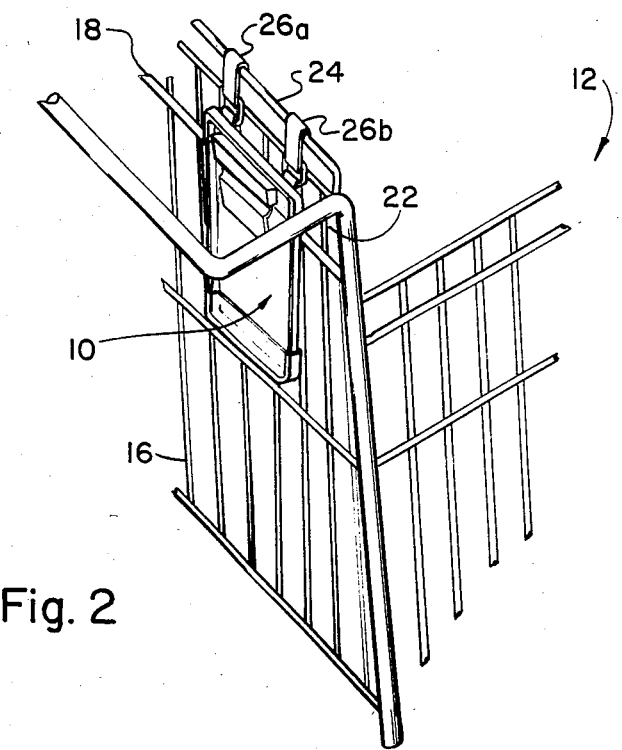
FIG. 2 shows the desk attachment of FIG. 1 in a collapsed nonuse configuration when the rear compartment of the cart is collapsed.

In FIG. 2, shopping cart 12 is partially shown with its rear compartment 20 collapsed by pivoting collapsible wall 22 against rear wall 16. Upon collapsing rear compartment 20, desk attachment 10 rides over the top 18 of rear wall 16 in a smooth manner since hangers 26a, 26b are articulated, as discussed below. Thus, desk attachment 10 in its collapsed nonuse position hangs vertically behind and adjacent to rear wall 16, without interferring with the conventional collapsing function of the shopping cart 12. Moreover, the articulated connection of the desk attachment 12 permits a number of desk-equipped carts 10 to be telescopically nested in conventional manner, the desk attachment pivoting upwardly and rearwardly as the cart rear wall 16 swings back and up from the FIG. 2 position during nesting.

Figure 3:
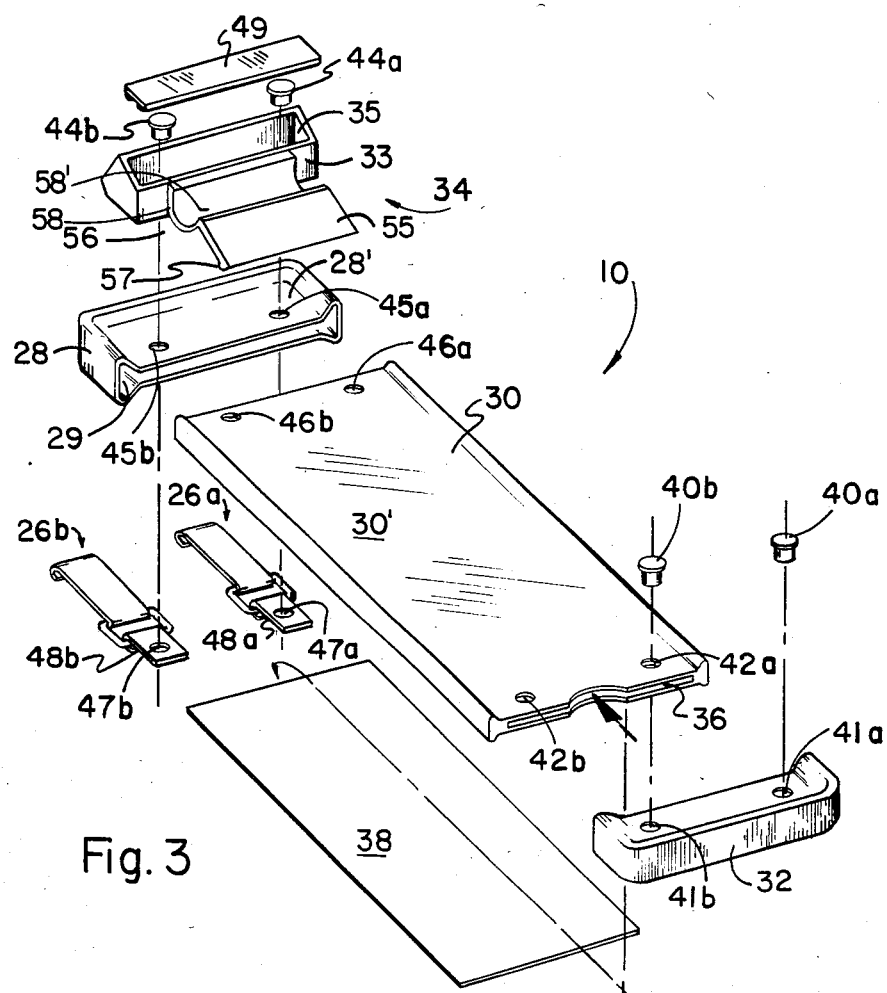
FIG. 3 is a fragmented pictorial view of the desk attachment of FIG. 1.

In FIG. 3, desk attachment 10 is shown in fragmented pictorial view. Platform 30 is preferably a transparent hollow shell having a substantially plane upper surface, and with interior slot 36 for insertion of advertising material 38 which is visible through the upper surface 30' of the platform. After inserting advertising material 38 into slot 36, lower end cap 32 is fitted onto the lower end of platform 30 with hole sets 41a, 41b and 42a, 42b being aligned such that rivets 40a, 40b are secured therethrough to affix lower end cap 32 to platform 30. Assembly of the upper end of desk attachment 10 includes fitting upper end cap 28 onto platform 30, aligning hole sets 45a, 45b and 46a, 46b, then mounting clamp 34 to the top surface 28' of the upper end cap. The mounting clamp 34 includes a clamp base 33 having a hollow interior space 35 with rivet holes (not shown) aligned respectively with holes 45a, 45b. Hangers 26a, 26b then are mounted to the underside of end cap 28 by aligning hole sets 47a, 47b, and finally securing rivets 44a, 44b through the respective aligned hole sets. Cover plate 49 is then fitted over clamp base 33 to conceal its interior 35.

A flap 55 is joined to the clamp base 33 by a resilient connection such as the channel-shaped bridging member 58 integrally molded with the flap and clamp base. A lip 57 protrudes downwardly from the outer edge of the flap 55 and engages the confronting region of the platform upper surface 30'. Shopping lists or the like are held on the platform 30 by the lip 57, and the resilient connection with the clamp base 33 permits removal of the list when desired. The channel 58' formed in the bridging member 58 conveniently holds a pencil while the platform 30 is in the attitude shown in FIG. 1.

Figure 4:
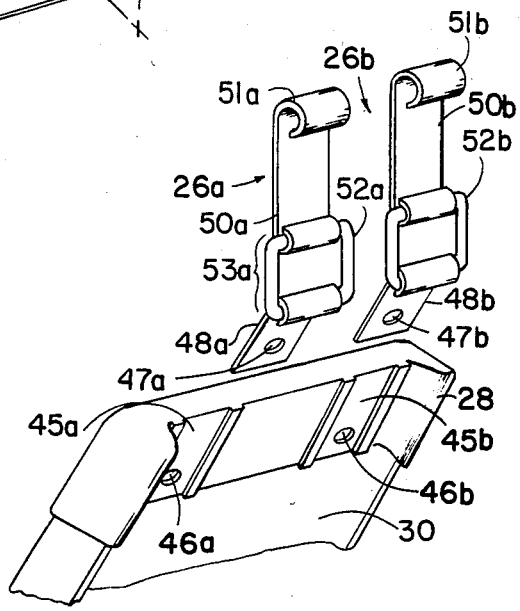
FIG. 4 is a pictorial view of a set of articulated hangers, shown fragmented in relation to one end of the desk attachment of FIG. 1.

In FIG. 4, there is shown a perspective view of the upper end 28 of desk attachment 10 from its underside, illustrating the details of construction of hangers 26a, 26b. Generally, only hanger 26a will be discussed since hanger 26b is substantially identical. Hanger 26a has at its lower end a tab 48a with hole 47a therethrough for alignment with hole 46a in end cap 28. The region on the underside of end cap 28 around hole 46a is channeled as generally indicated at 45a to correspond to the width of tab 48a, to promote rigidity in affixing tab 48a to end cap 28 and to provide an end cap structure flush with the sides of the tab 48a. Hanger 26a at its upper end has metal strap 50 which is deformed at 51 around rod member 24 of cart collapsible wall 22 such that the upper end of hanger 26a is pivotally affixed to rod 24. At the lower end of strap 50 there is a link 52, pivotally linking strap 50 and tab 48a at articulated joints 53a as shown. Thus hanger 26a is said to be an articulated hanger, and in the example shown has two articulations among the three component segments of the hanger such that the hanger is pivotally collapsible at each of the articulations. As discussed above in connection with FIG. 2, the purpose of the articulated hangers is to promote smoothness in collapsing the desk attachment 10 to its nonuse position upon collapsing rear compartment 20 of cart 12; while supporting the desk attachment in a substantially horizontal attitude shown in FIG. 1, conducive for reading a shopping list or the like.

Figure 5:
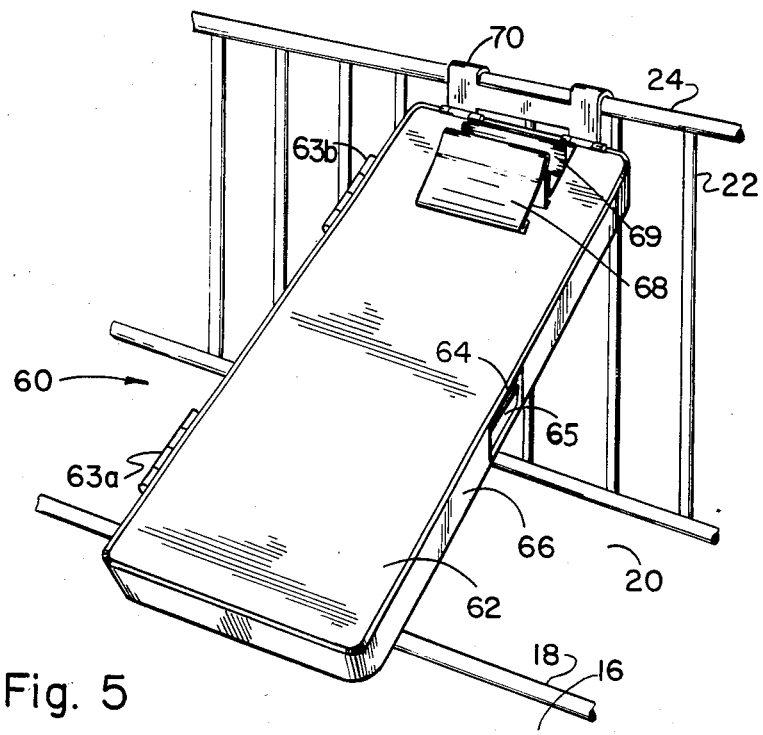
FIG. 5 is a partial pictorial view of a shopping cart having a collapsible rear compartment and having attached thereto another preferred embodiment of the invention, being a portable desk attachment with an internal storage compartment.

In FIG. 5, another preferred embodiment of the invention is shown by desk attachment 60 which is portable and includes an interior storage compartment. Unlike the other embodiments described herein, the desk attachment 60 is not intended for permanent attachment to the cart 12; instead, the desk attachment preferably is carried by the shopper on his or her rounds and is easily attached to a selected shopping cart in any store. When leaving that store, the shopper removes the desk attachment 60 from the shopping cart.

Desk attachment 60 is shown as mounted on shopping cart 12 of FIG. 1. Thus, compartment 20 is the rear compartment of cart 12 when open, the rear compartment having collapsible wall 22 with top rod member 24 and rear wall 16 with top rod member 18. Desk attachment 60 is supported at its lower end by resting on the top of rear wall 16 at 18, and its upper end is suspended by hanger assembly 70 from top rod member 24 of collapsible wall 22.

Desk attachment 60 has a hinged lid 62 which provides access to the interior desk compartment, as further discussed below, and serves as a desk surface on desk platform 66, with clamp 68 serving to secure writing paper thereto and with holder 69 serving to hold a pencil or the like during shopping. Hinged lid 62 is secured to desk platform 66 at hinges 63a, 63b and by latching member 64. As above, hanger assembly 70 is of selected length corresponding to the desired inclination of the desk attachment 60 in its use position as shown. Preferably hanger assembly 70 will be of a length sufficient to allow desk attachment 60 to rest in substantially horizontal use position. Further, hanger assembly 70 is articulated, as discussed below, to permit a free-hanging configuration of desk attachment 60 in its use position.

Figure 6:
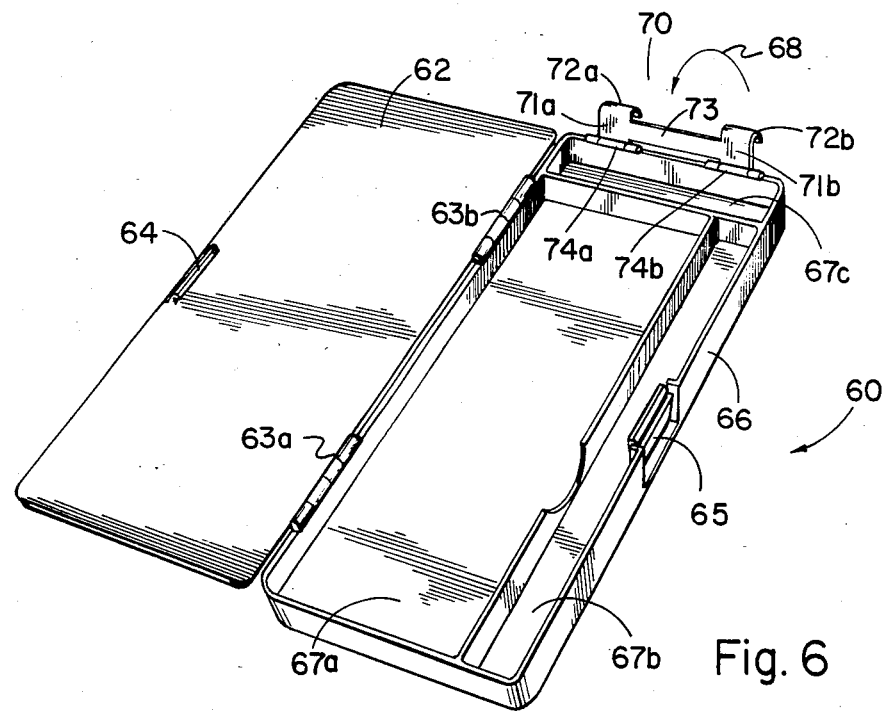
FIG. 6 is a pictorial view of the desk attachment of FIG. 5 shown removed from the cart and with its storage compartment open.

In FIG. 6, there is shown a perspective view of the desk attachment 60 as it would appear removed from shopping cart 12 and with its storage compartment exposed. Hinged lid 62 is opened by releasing latching member 64 from latch 65 and then pivoting lid 62 about its hinges 63a, 63b, thereby exposing the interior of platform 66. Preferably, the interior of platform 66 is divided into three subcompartments 67a, 67b, 67c with subcompartment 67a being configured to store note paper and shopping coupons, with subcompartment 67b being configured to store pencils and pens, and with subcompartment 67c being configured to receive hanger assembly 70 upon rotation in the direction indicated by arrow 68 such that hanger assembly 70 lies flat in subcompartment 67c. The subcompartments 67a and 67c also may be used to contain coupons or other articles. A user at the completion of shopping removes desk attachment 60 from the shopping cart by slipping the hooks 72a, 72b off the top rod member 24 of the wall 22, opens hinged lid 62, folds hanger assembly 70 inside and finally closes lid 62. Thus, desk attachment 60 is said to be portable. Hanger assembly 70 is a unitary assembly having straps 71a, 71b laterally joined by cross-member 73 with the upper ends of straps 71a, 71b being deformed so as to form the hooks 72a, 72b which hook over rod element 24 of collapsible wall 22 of cart 12. At the lower end of straps 71a, 71b, assembly 70 has hinges 74a, 74b, and thus is said to be articulated. As discussed above in connection with desk attachment 10, the purpose of the articulated hanger is to permit free suspension of the desk attachment when in use on the shopping cart. Further, the articulations permit in this embodiment a convenient storage configuration after the shopper has removed the attachment from the shopping cart.

Figure 6A:
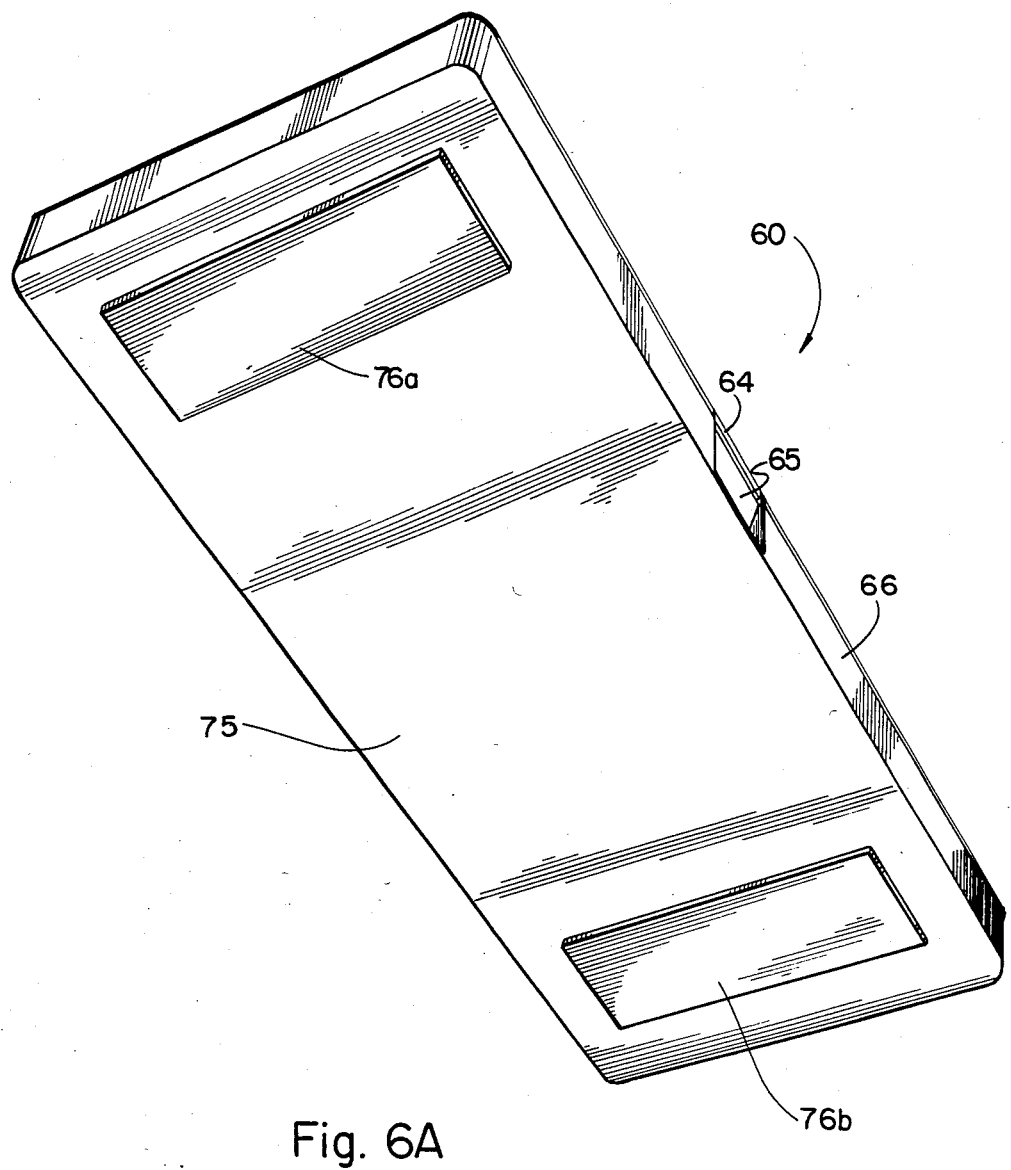
FIG. 6A is a bottom view of the desk attachment of FIG. 5 having magnetic strips attached thereto.

In FIG. 6A, there is shown an underside view of the desk attachment 60 removed from the shopping cart. The underside 75 has affixed thereto magnetic strips 76a, 76b toward each end of the desk attachment. Preferably, the magnetic strips are of conventional magnetic adhesive tape. With the magnetic strips, the desk attachment may be temporarily stored in the home by affixing to a metal appliance, e.g. a refrigerator door. Additionally, during use of the desk attachment as shown in FIG. 5, the lower magnetic strip 76a magnetically attaches to rod member 18 of shopping cart 12, thereby promoting writing stability of the desk attachment.

Figure 7:
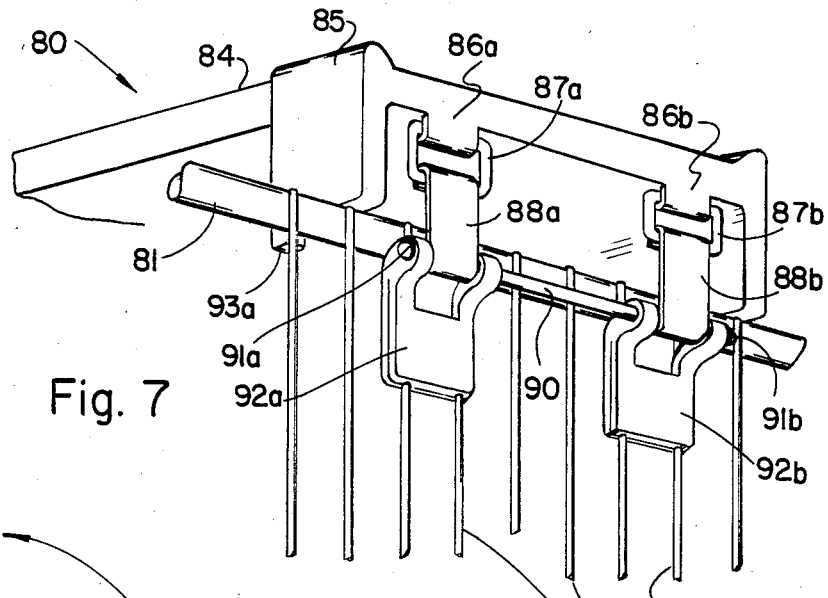
FIG. 7 is a partial pictorial view of another preferred embodiment which is a desk attachment cantilevered from the top of the rear basket wall of a shopping cart of the type not necessarily having a collapsible rear compartment.
Figure 8:
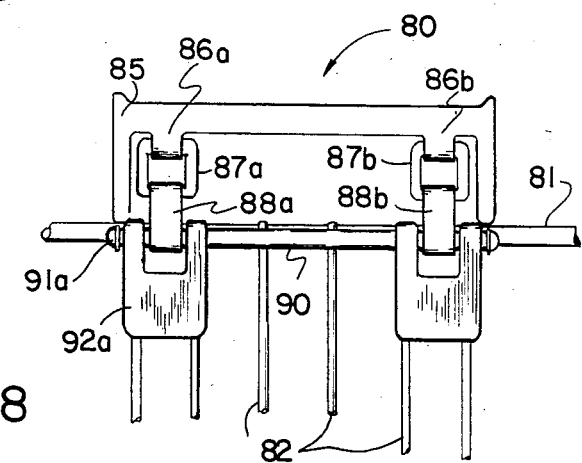
FIG. 8 is a front end view of the desk attachment shown in FIG. 7.

In FIG. 7, there is shown a partial perspective view of another preferred embodiment of the invention which is cantilevered from the top of a shopping basket rear wall, the shopping cart being of the type that does not necessarily have a collapsible rear compartment. FIG. 8 shows a front view of FIG. 7. Cantilevered desk attachment 80 in the use position is cantilevered over top rod member 81 of the rear wall of the shopping cart. The cart basket is of conventional construction being of open rod construction having vertical rod members 82 as part of the rear wall of the cart basket. In such a cart, typically the entire basket is hinged at the extremities of top rod 81 so that the entire basket may be pivoted to a vertical position for serial storage of a plurality of shopping carts when not in use. Desk attachment 80 has desk platform 84 and upper end cap 85 affixed to platform 84 generally as discussed above. End cap 85 has integral thereto cantilever supports 93a, 93b, which act as blocks against rod member 81, thereby establishing a fulcrum support relative to cantilevering rotation. End cap 85 has integral tabs 86a, 86b for pivotal connection to linkage means for securing the desk attachment 80 to the shopping cart. The linkage means comprises tab 86 pivotally formed around link 87 at one side of the link, and at the other side of the link pivotally formed therearound is strap 88 which at its lower end is pivotally formed around connecting rod 90. As shown, the linkage means is preferably a pair of such assemblies. It will be noted that the linkage means is somewhat similar to the articulated hanger of FIG. 4 but being operatively inverted. The linkage is pivotally collapsible at its articulations to promote smoothness during movement between the use and nonuse positions of the desk attachment as discussed below. Connecting rod 90 is insertionally fitted through tracking members 92a, 92b which preferably are sliding members secured in sliding engagement with vertical rod members 82 of the rear wall of the shopping cart. Sliding members 92 are secured to the connecting rod 90 by ring locks 91a, 91b at the respective ends of connecting rod 90. Straps 88 of the linkage means are of selected length such that when sliding members 92 are moved to their upper terminal positions on the rear wall of the cart, desk platform 84 will be at the desired inclination, most preferably a horizontal position, and will be further supported in that position by cantilever supports 93a, 93b on the underside of end cap 85.

Figure 9:
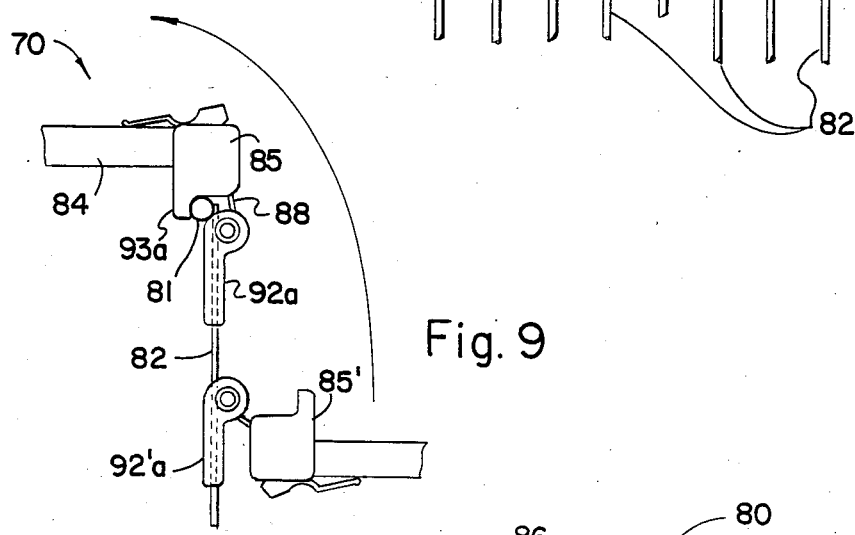
FIG. 9 is a schematic side view of the desk attachment of FIG. 7 showing the relationship between the cantilevered use configuration and the collapsed nonuse configuration.

In FIG. 9, there is shown a side view of the desk attachment 80 of FIG. 7 illustrating the relationship between the cantilevered use position of the desk and its collapsed nonuse position. Moving the desk attachment 80 from its cantilevered use position to its vertical nonuse position comprises rotating platform 84 over top rod member 81 into the shopping cart basket such that desk attachment 80 hangs from sliding member 82 in a substantially vertical orientation along and in close proximity to the rear wall elements 82 of the shopping cart basket. Under the hanging load that results, sliding members 92 are moved down the rear wall of the cart so that the desk attachment 80 rests at the bottom of the shopping cart basket. Conversely, in returning the desk attachment 80 to its use position sliders 92 are moved up the rear wall of the shopping cart to their terminal positions against rod member 81 and then the desk platform is pivoted about rod member 81 toward the rear of the shopping cart and cantilevers over rod member 81 by virtue of cantilever supports 93, by straps 88 being of appropriate length, and by sliders 92 being terminally moved against rod element 81.

Although the present invention has been described in conjunction with preferred embodiments, it is to be understood that modifications and variations may be utilized without departing from the principles and scope of the invention as defined by the following claims.

I claim:

1. A desk attachment for a shopping cart having a rear compartment defined in part by front and rear walls and collapsible as between said front and rear walls, the desk attachment being readily removable from the cart by the shopper, said desk attachment comprising:
  a planar desk platform of a length sufficient to span said front and rear walls when the compartment is open;
  an enclosure within said desk platform;
  a lid attached to said desk platform and selectively operative to open or close said enclosure, said lid having an upper surface comprising a writing surface; and
  a hanger pivotably attached at one end of said platform and having hook means operative for readily disengagable and pivotable engagement with the top of one of said walls, said hanger being selectively movable into said enclosure of the desk platform when disengaged from said one wall, whereby the desk attachment is readily removed and carried by the shopper when leaving the store.

2. The desk attachment of claim 1 further comprising a magnet affixed to the underside of said platform in operative alignment with the top of the other said wall when the hook means engages the top of the one wall, so as to stabilize the desk attachment in place on the shopping cart.

3. The desk attachment of claim 1, wherein:
  said hanger is pivotally attached at said platform end and extends upwardly therefrom to place said hook means in position to engage and depend downwardly from the top of said one wall, so that said upper surface of said lid is maintained a selected distance below the top of said one wall, with the other end of said platform resting on the top of the other wall of the open rear compartment.

4. The desk attachment as in claim 1, wherein:
  said hanger is pivotally movable to either a first position placing said hook means within said enclosure, so that the hook means is contained within the enclosure when said lid is closed, or to a second position placing the hook means out of the enclosure and extending for said engagement with the top of said one wall,
  so that the desk attachment can be carried separated from the shopping cart with the hook means contained within the closed enclosure.

5. The desk attachment as in claim 4, wherein:
  said hanger in the second position extends upwardly from and proximately vertical in relation to said one end of the compartment;
  said hook means comprises at least one hook member positioned for readily removable fit over the top of said one wall as the hanger extends upwardly from the enclosure, and the other end of said desk platform rests on the top of the other wall of the shopping cart rear compartment when open; and
  said lid is operable to close said enclosure with the hanger in both the first and second positions, so that the lid can remain closed while the desk attachment is attached to a shopping cart.

* * * * *